United States Patent [19]
Boyd et al.

[11] 4,074,406
[45] Feb. 21, 1978

[54] METHOD FOR MANUFACTURING SOLAR ENERGY COLLECTORS

[76] Inventors: John B. Boyd, 177 Hemlock Court, Palo Alto, Calif. 94306; Norman E. Rees, 334 Hawthorne Ave., Palo Alto, Calif. 94301

[21] Appl. No.: 699,692

[22] Filed: June 25, 1976

[51] Int. Cl.² .................................... B23P 15/26
[52] U.S. Cl. .................... 29/157.3 C; 165/168
[58] Field of Search .............. 29/157.3 C, 157.3 A, 29/157.3 R, 157.3 D, 157.3 V, 157.3 B; 165/182

[56] References Cited
FOREIGN PATENT DOCUMENTS 1,066,524  10/1959  Germany .................. 29/157.3 C
403,899    1/1934   United Kingdom .......... 29/157.3 C Primary Examiner—C.W. Lanham
Assistant Examiner—V. Rising
Attorney, Agent, or Firm—Michael L. Harrison

[57] ABSTRACT

A sinuous pattern of soft copper tubing is pressed against a laminated assembly consisting of a thin sheet of copper laminated to a layer of insulating foam which is in turn laminated to a backing plate of pressed wood. As the pressure is increased, the tubing deforms the copper sheet in conformity with the shape of the copper tubing. The foam resists deformation of the sheet in areas not directly beneath the copper tubing resulting in a well-defined trough adapted to receive the copper tubing which deforms it. The copper tubing and sheet are then bonded together resulting in a thermally efficient, inexpensively produced collector panel.

10 Claims, 7 Drawing Figures

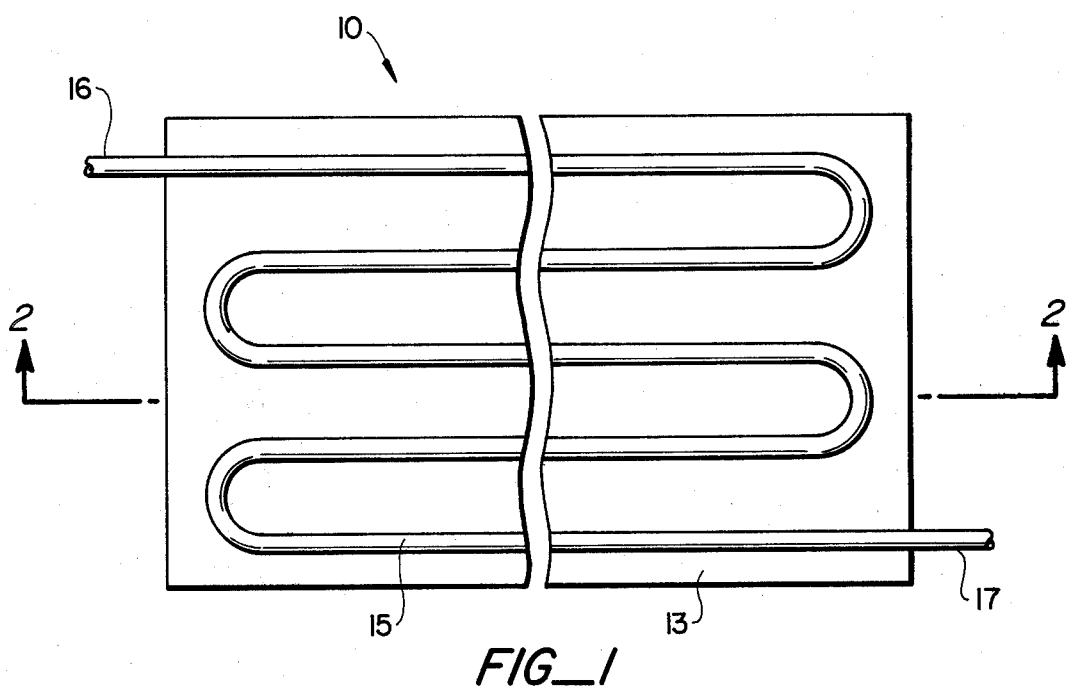
FIG_1
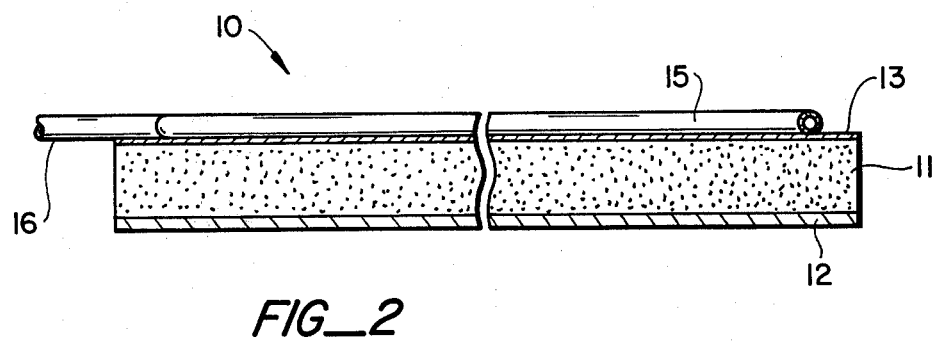
FIG_2
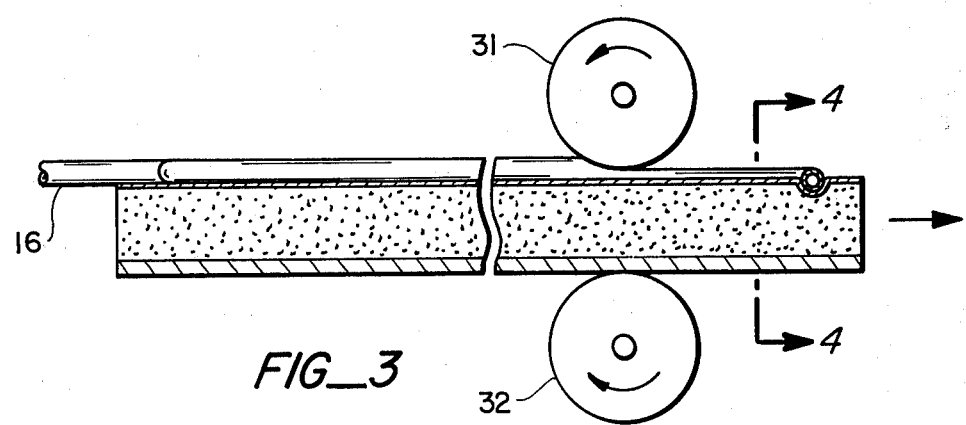
FIG_3

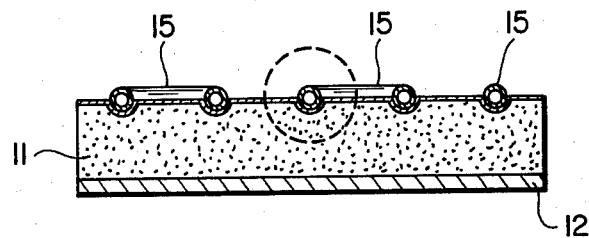
FIG_4
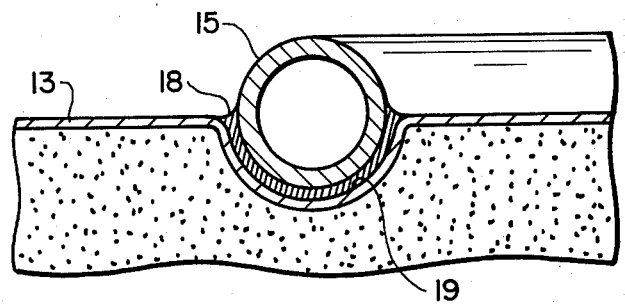
FIG_5
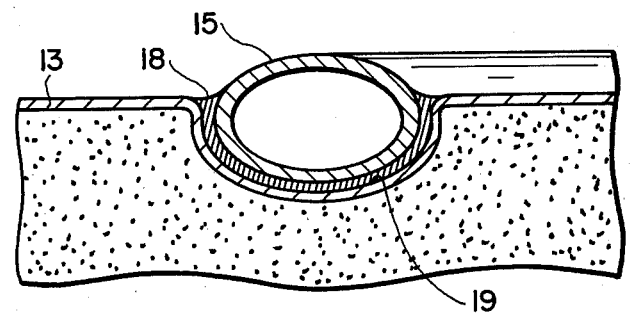
FIG_6
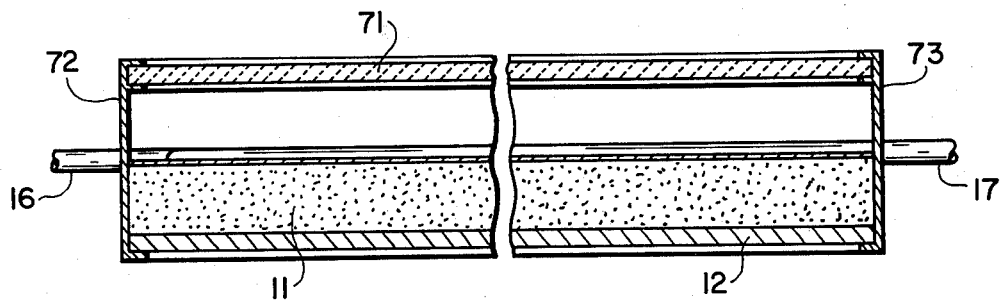
FIG_7

METHOD FOR MANUFACTURING SOLAR ENERGY COLLECTORS

BACKGROUND OF THE INVENTION

1. Field of the Invention

The present invention relates to heat exchangers and to solar energy collectors and in particular to a method for fabricating solar energy collector panels of the flat-plate type.

2. Prior Art

An urgent, current need exists for alternative energy supplies to fill the gap between industrial, commercial and residential energy needs and the ability of dwindling supplies of fossil fuels to satisfy those needs. Nuclear fission offers near-term relief, but supplies of fissionable material are also limited and, in addition, nuclear energy production is accompanied by as yet unsolved problems of waste disposal, plant and fuel transportation security risks, and high capital costs.

Since a large amount of energy produced is used for heating homes, and commercial and industrial buildings, and for heating water supplies for bathing, washing and similar activities, elimination or reduction of the energy required for those activities from the current energy distribution channels would mean that current energy sources can be stretched over a longer period of time and used in ways for which they are most efficient; i.e., petroleum reserves could be applied to transportation needs while coal and uranium reserves could be used to produce electricity for use in lighting, industrial processes, communications and similar areas for which electricity is ultimately required.

It has been proposed to use the sun's energy for this purpose, and indeed solar energy is being used on a limited basis for residential heating and has been so used for quite some period of time. More widespread use is required for this alternative to produce any appreciable reduction in overall energy needs, but widespread use on a residential basis is generally hampered by the high capital costs of collection and storage apparatus since the cost must generally be bourne by the individual homeowner. Although it may be shown that savings in other costs over a period of time will equal or exceed the cost of purchasing and installing solar collector equipment, the large capital outlay requirement is nonetheless a serious deterrent to widespread use of solar energy.

Of the proposed solar energy collection schemes, the most commonly used and, generally speaking, the most convenient and efficient is the flat-plate collector. Although more exotic schemes are available, the flat-plate collector is generally considered best for reasons of initial cost and compatibility with existing architectural styles, and compatibility with existing home systems.

Of the many flat-plate collectors designed, most employ a thin sheet of copper to which is bonded a copper tubing which meanders over the surface of the sheet to achieve maximum thermal conductivity between all areas of the sheet and the walls of the tubing. Common additions include darkening of the surface of the sheet to achieve higher energy absorption, and, insulation of the back of the collector plate and glazing of the front to prevent excessive heat loss.

A drawback of the flat-plate collector, and of many other engineering situations as well, lies in the oft-encountered dilemma that if the device works efficiently it is expensive to produce, while if it is inexpensively produced, it works inefficiently.

The primary cost of the solar collector lies in its raw materials, but substantial labor costs are encountered and must be reckoned with in the manufacturing process. Of these, the cost associated with achievement of a close thermal bond between the copper tubing and the copper sheet loom large. At the same time, failure to devote sufficient attention to thermal bonding will result in an inefficient collector design since less than maximum transfer of heat energy will occur between the sheet and the tubing.

The most common solution is to position the copper tubing against the copper sheet and then to solder, braze or otherwise bond the two together. If thermally conductive bonding material is used, the bonding material as well as the contact between sheet and tubing will provide a thermal path, and if sufficient filleting of the gap between the curving side of the tube and the sheet is produced, the energy transfer may be quite efficient. Producing maximum transfer efficiency does consume a large amount of bonding material, however, and is at best an uncertain and difficult-to-control process. In addition, use of soldering or brazing requires large amounts of heat to be applied, thereby necessitating that the bonding process take place before insulation is added to the collector. This additional step in processing adds to the handling requirement and therefore to the cost of producing the plates.

It has been proposed to eliminate or reduce the problems of bonding while achieving high thermal efficiency by curving the sheet to conform to the tubing, and previous attempts to secure a close thermal bond by means of forming a conductive copper plate around a copper tube have been described in patents issued to several applicants. In each case the method described involves separate formation of a groove generally conforming to the outline of the tubing which is then placed inside the groove. Various other procedures are used to cause the tubing wall to collapse inward, causing portions of the tubing to expand outward against the backing plate or to cause the backing plate to fold slightly around the tubing. In a patent issued to Sandburg U.S. Pat. No. 2,666,981, for example, the groove is formed in a backing plate by a cooperating roller and die, the roller having a protrusion which forms a groove against a mating die surface. Once the groove is formed, a second step also involving a roller flattens the groove slightly, causing partial collapsing of the side walls from a straight configuration into arcuate configuration. Into the groove is then placed a tubing having a diameter slightly smaller than the width of the groove. In a fourth step, the top of the tube is pressed with a third roller which urges the sides of the tubing outward against the arcuate wall of the groove in the backing plate which is held firmly affixed in a die.

A second patent issued to Sandburg 2,585,043 describes a heat exchanger which is manufactured by first providing a grooved backing plate having raised ridges on each side of the length of the groove. After a tube has been formed and is accommodated into the groove, portions of the raised ridge are deformed by pressing them against a backing die causing the ridges along the groove to overlap the edge of the round tube, thereby entrapping the tube at the bottom of the groove.

In a related method patent, O'dell 1,971,723 describes a method for securing automobile top covers which provides a groove in a metal surface having an arcuate bottom and sides essentially circular and a split tube which fits within the tube. The automobile top cover is placed over the groove and the split tube forced into the groove entrapping the cover between the groove and the metal surface. Then, to secure the top cover permanently, the split tube is compressed forming a flat surface even with the surface of the metal surface and causing the top cover to be compressed against the arcuate sides of the groove. Since greater than 180° of arc is provided, a portion of the metal surface wraps around the compressed split tube thereby retaining it. The split in the tube allows accommodation for movement of the side wall of the tubes without causing deformation of the metal surface.

All of the above-described processes suffer form the common requirement of careful, labor-intensive steps to ensure good thermal bonding. Of those processes which employ some form of groove adapted to receive the copper tubing, all require multiple press operations employing expensive dies. In all cases, the shape of the tubing must be carefully matched to the groove to achieve proper fit. Slight variances in one or the other will result in poor fit and loss of thermal efficiency, or in extreme cases, scraping of the non-fitting parts. The roller die employed in the first Sandberg invention is not amenable to use in forming sinuous patterns in the copper sheet since only straight grooves can apparently be formed.

It is desirable therefore to provide a method for manufacturing solar collector panels which avoids the above problems and which results in a collector panel which is thermally efficient and inexpensive of both labor and materials.

SUMMARY OF THE PRESENT INVENTION

Accordingly, it is an object of the present invention to provide a method for manufacturing heat exchangers which is economical in use of materials.

It is another object of the present invention to provide a method for manufacturing heat exchangers which avoids labor intensive operations.

Yet another object of the present invention is to provide a method for manufacturing heat exchangers which are thermally efficient.

Yet still another object of the present invention is to provide a method for manufacturing heat exchangers which provides for a large percentage of contact between the backing plate and the copper coolant tubing.

Yet still another object of the present invention is to provide a method for manufacturing heat exchangers which is rapid.

Yet still another object of the present invention is to provide a design for heat exchangers which are easily mass produced.

Yet still another object of the present invention is to provide a method for manufacturing heat exchangers which is producible without requirement of great investment in capital equipment.

Yet still another object of the present invention is to provide a method for manufacturing heat exchangers which are durable.

Briefly, the present invention accomplishes these and other objects by providing a method employing soft, thin copper sheeting and soft, thin-wall copper tubing. The copper tubing is formed into a suitable geometry, generally a serpentine shape for overlay on the copper sheet. The copper sheet is provided with a backing of high density foam insulation which is chosen to yield at moderate applied forces when pressure is applied. The three layers of tubing, the copper sheet, and the foam backing are passed between the nap of two high pressure rollers. As the copper tubing is passed between the rollers, it becomes crushed slightly against the resistance offered by the thin copper sheet and its foam backing. The copper sheet in turn is deformed into approximately the shape of the copper tubing which is pressing against it. The foam insulation is similarly deformed and being a non-resiliant type of foam does not attempt to spring back to its original position. When the assembly has been entirely passed through the roller press, an assembly is produced which provides for close thermal contact between the copper tubing and the copper plate as well as a conforming foam insulation on the back panel.

BRIEF DESCRIPTION OF THE DRAWINGS

These and other objects are achieved by the present invention by means which are best understood by making reference to the drawings wherein:

FIG. 1 is a top view of a solar collector panel made in accordance with the present invention, prior to passage of the assembly through the rollers.

FIG. 2 is a sectional view of the assembly depicted in FIG. 1 through section 2—2.

FIG. 3 depicts the passage of the assembly through a roller press.

FIG. 4 is a sectional view of the assembly taken at section line 4—4 after the passage of the assembly through the roller press.

FIG. 5 is a detail view of one portion of the tubing enclosed dotted lines in FIG. 4.

FIG. 6 depicts the tubing shown in FIG. 5 after being subjected to different processing.

FIG. 7 shows the assembly in completed form.

DESCRIPTION OF THE PREFERRED EMBODIMENT

Referring now to FIGS. 1 and 2, there is shown a top view of a solar collector panel 10 in the initial stages of fabrication in accordance with the present invention. The copper tubing 15 has been formed into a sinuous pattern, visible in FIG. 1, covering most of the area of the copper sheet 13. Inlet 16 and outlet 17 ports extend beyond the edge of the copper sheet for connection to coolant lines.

The copper sheet 13 is initially laminated to a layer of insulating foam 11, visible in the section view FIG. 2. In turn, the foam is laminated to a backing panel 12 made of pressed wood.

Following lamination of the copper sheet/foam/backing panel assembly, and formation of the tubing into a sinuous pattern, the tubing is placed on the copper sheet and is positioned and held in contact with the sheet by a suitable fixture.

FIG. 3 depicts the passage of the tubing and copper sheet through the rollers 31 and 32 of a roller press. The backing panel 12 supports the foam 11 causing the pressure to be more evenly distributed throughout the back of the assembly, thereby preventing the foam from being crushed by high local pressures.

On the top of the assembly, the tubing 15 is shown deforming the surface of the copper sheet producing a groove in the sheet which conforms to the shape of the tubing 15. As the length of the assembly 10 passes through the rollers 31 and 32, the entire length of the tubing 15 becomes pressed into the surface of the copper sheet.

Referring now to FIG. 4, there is shown a cross-sectional end view through section 4—4 of FIG. 3 of the collector panel 10 after passage through the roller press has been completed. The depth of penetration into the copper sheet may be regulated by varying certain parameters as will be described below.

Referring now to FIG. 5, there is shown a detail view of the portion of FIG. 4 enclosed in dotted lines. The tubing 15 is seated in the groove 19 formed in the copper sheet 13 by processing in accordance with the present invention. An additional desirable feature is illustrated by the dark area 18 between the tubing 15 and the sheet 13, which represents bonding material of an adhesive type or a eutectic alloy type such as solder or brazing compound. It will be desirable in most cases to provide such a bond between tubing 15 and sheet 13 to enhance the thermal efficiency of the collector panel and to retain the tubing securely.

If the fillet is made of solder or brazing material, the temperature limitations of the foam must be given due consideration. It is an advantage of the present invention that a minimum amount of filleting material is required due to the close contact between the tubing and the copper sheet. Since the material required is minimal, only minimal heat is required to be applied to the assembly. Thus, it is possible to solder or braze even though the lamination of the copper to the foam is done before the brazing process. In practice, some damage to the foam does result but its effect is negligible.

In FIG. 6, a variant of the technique described is illustrated. The tubing 15 in this case has been subjected to greater pressure causing the top of the tube to flatten slightly and producing an approximately elliptical shape. The tubing 15 has been forced almost level with the surface of the copper sheet 13 so that a larger percentage of its external area is in contact with the sheet. Where maximum thermal efficiency is required, this technique may be employed, but for most purposes it is not required.

FIG. 7 shows a cross-sectional view of a complete solar collector panel 10 made in accordance with the present invention. Glazing 71 has been added to enhance collector efficiency as is well known in the art. Extruded aluminum brackets 72 and 73 are adapted to hold the glass 71 and the backing plate 12. Apertures are provided at appropriate locations for clearance around inlet 16 and outlet 17 ports.

In practising the present invention, it will be desirable to choose materials for their mechanical as well as their thermal properties. The tubing 15 must be relatively strong in comparison to the yield strength of the foam-backed copper sheet 13, while the copper sheet should be as thin as is reasonably possible without becoming subject to rupture under the pressure of the tubing being forced into its surface. Minimum thickness will produce minimum manufacturing costs and insures that the copper sheet forms easily around the copper tubing as well. In the commercial units, a soft copper sheet of .010" has been found to be suitable.

The tubing 15 is preferably made of copper although other materials may be useful in some applications. Copper is preferred because of its twin desirable properties: it has high thermal conductivity and is easily formed into patterns. The sinuous pattern shown is an efficient one since it results in coverage of all useable area of the copper sheet without excessive waste. However, other patterns may be employed without departure from the teaching of the present invention.

Spacing of adjacent runs should be made with consideration being given to the trade-off between cost and efficiency. If a single run were used, for example, the cost of the collector would be minimum but its efficiency would be poor since, in areas distant from the tubing, the temperature of the copper sheet will rise to a point at which the heat loss through the sheet and through the surrounding air and materials equals the heat gained by solar absorption. The heat loss into surrounding air and materials represents wasted energy, so far as the collector is concerned, and the efficiency of the collector is diminished.

Varying tube dimensions and yield strengths may be selected for varying requirements. To produce the approximate results of FIGS. 4 and 5, soft copper tubing having an O.D. of one-half inch and an I.D. of three-eighth inches, and a nominal wall thickness of one-sixteenth inch is employed. Variations in thickness of the copper sheet and the stiffness of the foam will, of course, produce varying results.

The frame of the collector is preferably made from a material having requisite mechanical strength and the ability to withstand exposure to the environment described above, including the ability to withstand continuous exposure to the sun's rays. A desirable material is aluminum from which extruded forms having accomodation for the backing plate, the copper foil and glazing if so desired, are easily and inexpensively manufactured. A glazed collector has greatly improved efficiency over the unglazed type, particularly in areas in which high wind currents create a great amount of convection cooling of the collector's surface.

Selection of a suitable foam material must be done in conjunction with the selection of the copper sheet. It is desired to have a combination of the two which will yield in the area immediately beneath the tubing, but will resist general collapsing of the foam in areas not directly beneath the tubing. At the same time, it should be chosen to have desirable insulating properties to avoid loss of collected heat energy through the back plane of the collector. In many applications the foam will also be continuously exposed to extremes of hot and cold temperature thereby implying an ability to withstand that exposure as a requisite characteristic of the foam also.

A good choice for this material is TRYMER CPR 9545, manufactured by Upjohn, which is employed in the commercial version of the collectors manufactured in accordance with the present invention in 1 inch thickness slabs.

In producing the shape depicted in FIG. 6, reliance is placed on the characteristic of non-resilient foam that density is increased as the foam is compressed beyond the elastic limit of the cell structure. The density of the foam in the area surrounding the depression caused by the tubing being urged into the copper foil therefore increases as the displacement of the tubing increases with respect to the original surface of the copper sheet. As the density increases, the resistance offered to the bottom of the copper tubing by the copper sheet is likewise increased causing the copper tubing to be subjected to compressive forces between the bottom of the groove and the roller 31. As the forces reach the yielding strength of the copper tubing it begins to deform causing a flattening of the tube into an elliptical cross section and causing the sides of the groove to expand outward from the original circular shape. By proper selection of foil thickness, tubing hardness, and the foam density, the process may be caused to yield the proper amount of deformation of the copper tubing and in the proper amount of deformation of the copper sheet so that the maximum percentage of the surface of the copper tubing is in contact with the surface of the copper sheeting.

While a preferred embodiment of the present invention has been described, it should be understood that various changes, adaptions, and modifications may be made therein without departing from the spirit of the invention or the scope of the following claims.

We claim:

1. A method for fabrication of radiant heat collector panels comprising:
   a. forming thermally conductive tubing into a desired shape pattern;
   b. placing a thin, thermally conductive lamina permanently in contact with a mechanically resistive backing material, said lamina and backing material having a combined yield strength, in a direction perpendicular to the surface of the lamina, which is less than the yield strength of the thermally conductive tubing in a direction perpendicular to the length of the tubing;
   c. placing the formed tubing in contact with the thermally conductive lamina such that the wall of the tubing contacts the lamina along the entire length of the tubing; and,
   d. pressing the tubing against the lamina and backing material combination, whereby the tubing is urged into the lamina and backing material causing the lamina to conform to the contour of the copper tubing over a substantial portion of the surface of the tubing.

2. The method of claim 1 wherein the thermally conductive tubing is copper.

3. The method of claim 1 wherein the thermally conductive sheet is copper.

4. The method of claim 2 wherein the tubing is soft copper.

5. The method of claim 3 wherein the thermally conductive lamina is soft copper is soft copper.

6. The method of claim 1 wherein the mechanically resistive backing is non-resilient.

7. The method of claim 6 wherein the mechanically resistive, non-resilient backing is plastic foam.

8. The method of claim 1 wherein the mechanically resistive backing is insulating foam.

9. The method of claim 2 wherein the lamina and the mechanically and the mechanically resistive backing are bonded together.

10. The method of claim 1 wherein the tubing is pressed into the lamina and backing material combination by means of a pair of rollers, one roller acting upon the tubing wall at a point opposite the point of contact between the tubing and the lamina, the other roller acting on the surface of the backing material which is opposite the surface to which the lamina is attached.

* * * * *